(12) United States Patent
Bolsakovas et al.

(10) Patent No.: US 10,692,516 B2
(45) Date of Patent: Jun. 23, 2020

(54) DIALOGUE ANALYSIS

(71) Applicant: International Business Machines Corporation, Armonk, NY (US)

(72) Inventors: Ignas Bolsakovas, Hampshire (GB); Kevin C. Brown, Hampshire (GB); Dominic E. Thorne, North Somerset (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/581,323

(22) Filed: Apr. 28, 2017

(65) Prior Publication Data

US 2018/0315418 A1    Nov. 1, 2018

(51) Int. Cl.
| | |
|---|---|
| *H04L 29/06* | (2006.01) |
| *G10L 15/18* | (2013.01) |
| *G10L 21/0272* | (2013.01) |
| *G10L 25/48* | (2013.01) |
| *H04L 12/18* | (2006.01) |
| *H04L 12/58* | (2006.01) |
| *G06F 40/35* | (2020.01) |
| *H04M 3/42* | (2006.01) |
| *H04M 3/56* | (2006.01) |

(52) U.S. Cl.
CPC .......... *G10L 21/0272* (2013.01); *G06F 40/35* (2020.01); *G10L 15/1807* (2013.01); *G10L 25/48* (2013.01); *H04L 12/1831* (2013.01); *H04L 51/16* (2013.01); *H04L 65/403* (2013.01); *H04M 3/42221* (2013.01); *H04M 3/56* (2013.01); *H04M 2201/40* (2013.01)

(58) Field of Classification Search
CPC .......................... H04L 65/403; G10L 15/1807
See application file for complete search history.

(56) References Cited

U.S. PATENT DOCUMENTS

| | | | |
|---|---|---|---|
| 8,593,501 B1 * | 11/2013 | Kjeldaas | H04N 7/15 348/14.01 |
| 9,191,218 B1 | 11/2015 | Rehder et al. | |
| 9,300,790 B2 | 3/2016 | Gainsboro et al. | |
| 2003/0001890 A1 * | 1/2003 | Brin | G06F 3/04847 715/753 |
| 2004/0032486 A1 * | 2/2004 | Shusman | G06Q 30/02 348/14.09 |

(Continued)

OTHER PUBLICATIONS

Toner Analyzer, IBM Watson Developer Cloud, Retrieved from Internet on Jan. 27, 2017, http://www.ibm.com/watson/developercloud/tone-analyzer.html. 3 pages.

(Continued)

*Primary Examiner* — Bryan S Blankenagel
(74) *Attorney, Agent, or Firm* — Schmeiser, Olsen & Watts, LLP; William Hartwell (57) ABSTRACT

A method of determining a participant's contribution to a conversation or dialogue by generating a contribution score is provided. The contribution score may be determined based on at least one of a prosody analysis of a participant's input and an input reaction measure indicative of another participant's reaction to the participant's input. An associated computer system and computer program product is also provided.

17 Claims, 6 Drawing Sheets

(56) References Cited

U.S. PATENT DOCUMENTS

| | | | |
|---|---|---|---|
| 2006/0179022 A1* | 8/2006 | Holland | G06N 3/004 706/45 |
| 2009/0220064 A1* | 9/2009 | Gorti | H04M 3/56 379/202.01 |
| 2010/0036660 A1* | 2/2010 | Bennett | G10L 15/30 704/231 |
| 2010/0223581 A1* | 9/2010 | Manolescu | G06Q 10/00 715/853 |
| 2011/0035680 A1 | 2/2011 | Borovoy et al. | |
| 2011/0191109 A1* | 8/2011 | Harma | G10L 25/48 704/275 |
| 2012/0143921 A1* | 6/2012 | Wilson | G06Q 50/01 707/798 |
| 2012/0179465 A1* | 7/2012 | Cox | H04L 12/1822 704/235 |
| 2013/0066632 A1* | 3/2013 | Conkie | G10L 13/10 704/260 |
| 2013/0339105 A1* | 12/2013 | Russell | H04W 4/029 705/7.42 |
| 2013/0339875 A1 | 12/2013 | Sahai et al. | |
| 2014/0125678 A1* | 5/2014 | Wang | A63F 13/005 345/473 |
| 2014/0141392 A1* | 5/2014 | Yoon | G09B 5/04 434/156 |
| 2014/0297277 A1 | 10/2014 | Zechner et al. | |
| 2015/0179168 A1* | 6/2015 | Hakkani-Tur | G10L 15/22 704/257 |
| 2016/0294836 A1* | 10/2016 | Williams | H04L 63/102 |
| 2017/0099390 A1* | 4/2017 | Crowe | H04M 3/5233 |
| 2017/0125024 A1* | 5/2017 | Sundararajan | G10L 17/02 |
| 2017/0228135 A1* | 8/2017 | Vendrow | G06F 3/04845 |
| 2017/0270930 A1* | 9/2017 | Ozmeral | G10L 17/005 |
| 2017/0272396 A1* | 9/2017 | Chhaya | H04L 51/32 |
| 2017/0295213 A1* | 10/2017 | Aaron | H04L 65/403 |
| 2017/0359393 A1* | 12/2017 | Rajagopal | H04L 65/403 |
| 2017/0371615 A1* | 12/2017 | Gummadi | G06F 3/165 |
| 2018/0025743 A1* | 1/2018 | Childress | G10L 25/63 704/205 |

OTHER PUBLICATIONS

Prabhakaran et al., Who Had the Upper Hand? Ranking Participants of Interactions Based on Their Relative PowerInternational Joint Conference on Natural Language Processing, pp. 365-373,Nagoya, Japan, Oct. 14-18, 2013, pp. 365-373.

* cited by examiner

FIG. 7

DIALOGUE ANALYSIS

TECHNICAL FIELD

The present invention relates to the field of dialogue analysis and in particular, concepts of determining a contribution of a participant to a dialogue.

BACKGROUND

During a typical dialogue between at least two participants, such as a meeting, conference or interview, the contribution of a participant may vary. For example, in some meetings, certain participants may provide relevant, useful and/or numerous contributions, whereas others may only provide irrelevant, sporadic and/or unhelpful contributions.

SUMMARY

According to an embodiment of the present invention, there is provided a method, computer program product, and computer system for generating a contribution score indicative of a first participant's contribution to a dialogue between the first participant and one or more other participants. The method comprises analyzing the dialogue input of the first participant using a prosody analysis technique to obtain prosody information associated with the dialogue input and determining whether at least one of the one or more other participants provides a response, in the dialogue, to the dialogue input of the first participant. The method further comprises, in response to determining that a response is provided, determining an input reaction measure indicative of a reaction by the at least one of the one or more other participants to the dialogue input of the first participant and generating the contribution score based on at least the input reaction measure. The method comprises, in response to determining that no response is provided, generating the contribution score based on at least the prosody information associated with the dialogue input.

DETAILED DESCRIPTION

Embodiments of the present invention include determining a participant's contribution to a conversation or dialogue. The participant's contribution may be determined based on at least one of a prosody analysis of a participant's input and an input reaction measure indicative of another participant's reaction to the participant's input.

Embodiments of the present invention may be at least partly based on the realization that the prosody of a participant's input and/or the reaction of other participants may be indicative of the relevancy or helpfulness of the participant's input. For example, a confidence of a participant (e.g. in making the participant's input) or a positivity of a reaction by other participants may be considered indicative of the participant's input.

Illustrative embodiments may, for example, be employed in a teleconference or meeting scenario in order to determine the contribution of a participant to the conference/meeting, which may allow an arbitrator or chairperson to identify the most helpful or prolific contributors to thereby identify an influence of particular participants.

Figure 1:
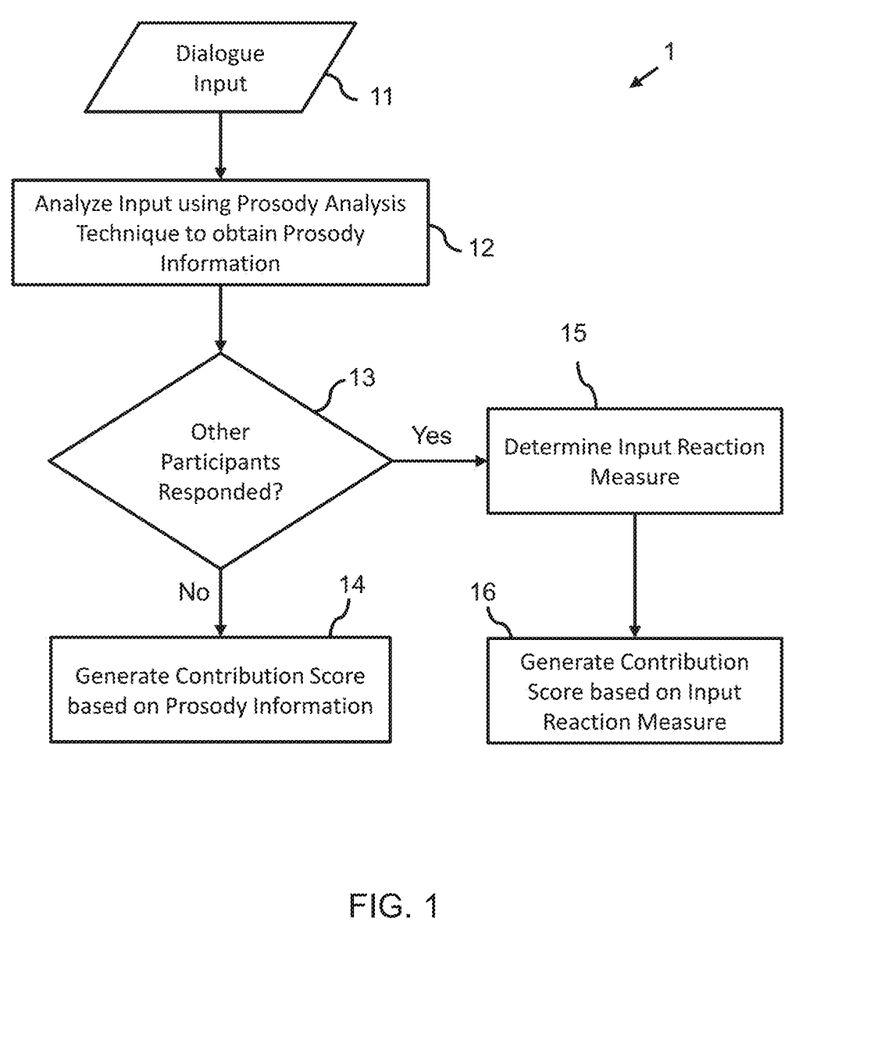
FIG. 1 is a flow chart of a method for generating a contribution score, in accordance with embodiments of the present invention.

Turning now to the drawings, FIG. 1 is a flow chart of a method 1 for generating a contribution score, in accordance with embodiments of the present invention.

The method 1 may comprise analyzing 12 dialogue input 11 of a first participant in a dialogue using a prosody analysis technique to obtain prosody information. By way of example only, the analyzing the dialogue input ay comprise gathering data about the prosody of the input, such as hesitations or aggression of the dialogue input.

The term dialogue input may be understood to mean an input or contribution of a participant to a dialogue or conversation. The dialogue input may, in exemplary embodiments, be in the form of an audio, vocalized or spoken form (i.e. speech). In other embodiments, the dialogue input may be in the form of a text or string.

The dialogue input may, for example, be a single instance of a dialogue input (e.g. a single 'turn' of a participant in the dialogue). In exemplary embodiments, the dialogue input may comprise more than one instance of a dialogue input (e.g. multiple 'turns' of a participant in the dialogue).

In embodiments in which the dialogue input is an audio input, a prosody analysis technique may, for example, gather data or information about any of the following: an intonation, stress, tone, rhythm, tempo, pitch, frequency, timbre, intensity, duration, syllable length, speed, or frequency characteristic or other attribute of the dialogue input. In some embodiments, the analyzing the dialogue input may comprise gathering data or information aboutate of change in any of previously identified attributes (e.g. intonation, stress, etc.).

The prosody analysis technique may comprise using at least one of the following: a tone analysis technique, a pitch analysis technique, a rhythm analysis technique or a spectral analysis technique. Such techniques may be employed, for example, using a linguistic analysis engine to detect communication tones in written text.

In at least one exemplary embodiment, analyzing 12 the dialogue input may comprise generating an emotion score indicative of an emotion or possibly an attitude of the first participant when providing the dialogue input. The value of the emotion score may, for example, be based on data gathered about any of the previously identified attributes of the dialogue input.

The method 1 may further comprise determining 13 whether a response is provided by at least one other participant in the dialogue to the dialogue input. In a similar manner to the dialogue input, the response is in the form of an audio, vocalized or spoken form.

The method 1 may further comprise, in response to no response being provided, generating 14 a contribution score of the first participant based on at least the analysis of the dialogue input.

The method 1 may further comprise, in response to a response being provided, determining 15 an input reaction measure indicative of a reaction of at least one participant to the dialogue input. In other words, when a response is provided by another participant, an input reaction measure (i.e. associated with that response) r ray be obtained to provide an indication of the other participant's response or reaction to the dialogue input of the first participant.

The method 1 may further comprise, when a response has been provided, generating 16 a contribution score based on the input reaction measure. In other words, the method may generate the contribution score of the first participant based on a response of at least one other participant to the dialogue input of the first participant.

Embodiments of the method 1 may comprise obtaining the dialogue input and/or the responses to the dialogue input. The method 1 may comprise obtaining such a dialogue input or response via an audio recording arrangement, such as a microphone or other transmitter. Alternatively, the method 1 may comprise obtaining the dialogue input and/or responses from a text transcript, chat log, real-time text or other text-based messaging record.

Embodiments may recognize that both emotion and delivery characteristics of a dialogue input play an important role in the effectiveness of a participant's contribution. By way of example only, an angry and short dialogue input (e.g. an outburst) may contribute less to a conversation or dialogue than a calm and methodical dialogue input (e.g. a reasoned explanation). Embodiments of method 1 may be able to determine an emotion of a dialogue input, for example, based on a prosody analysis of the dialogue input, which may be represented by the contribution score that reflects at least one of the emotion of a contribution and/or the emotions associated with responses to the contribution.

Embodiments of the method 1 may also recognize that a response of another participant to a dialogue input may be indicative of an effectiveness or usefulness of a contribution provided by that dialogue input.

Embodiments of the method 1 may thereby enable a contribution score of a participant to be easily and reliably generated.

As referred to hereinafter, a contribution score of a participant in the dialogue may be a numerical measure typically used to indicate the participant's perceived contribution to the dialogue. Thus, the contribution score may comprise a number or value representing points or marks. In particular, the contribution score may be a numerical measure of the perceived effectiveness, relevancy, importance, astuteness, helpfulness, knowledgeability or insight of the first participant's contribution. However, the contribution score may, for example, be a non-numerical indicator "Good", "Poor," etc).

Figure 2:
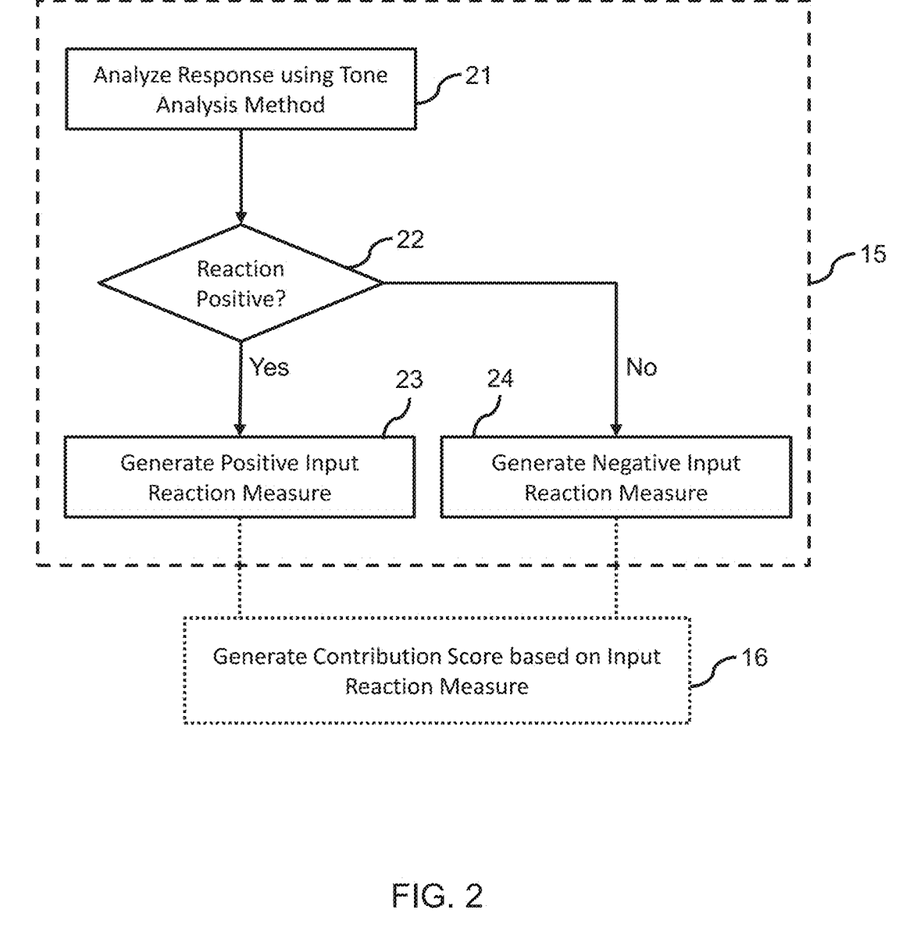
FIG. 2 is a flow chart of a step of the method of FIG. 1, in accordance with embodiments of the present invention.

With reference now made to FIG. 2, which depicts a flow chart of a step of the method of FIG. 1, in accordance with embodiments of the present invention. In particular, FIG. 2 depicts a step of determining 15 the input reaction measure, according to an exemplary embodiment.

The step of determining 15 the input reaction measure may comprise analyzing 21 the response using a tone analysis method.

The analyzing 21 may comprise identifying a reaction of the at least one other participant associated with the response. In particular, the analyzing may comprise determining an emotive reaction associated with the response to the dialogue input, being an emotion associated with the response. Possible tone analysis methods may comprise, for example, using a prosody analysis technique on the response to identify a reaction or emotive reaction associated with the response.

The step of determining 15 may further comprise determining 22 whether or not the reaction associated with the response is positive.

In response to determining 22 that the reaction is positive, the step of determining 15 the input reaction measure may comprise generating 23 positive input reaction measure. In response to determining that the reaction is negative, the step of determining 15 the input reaction measure may comprise generating 24 a negative input reaction measure.

Put simply, the step of determining 15 the input reaction measure may comprise analyzing 21 the response and determining 22 whether a reaction associated with the response is positive or negative. The method 1 may comprise either generating 23 a positive input reaction measure or generating 24 a negative input reaction measure based on this determination.

More than one input reaction measure may be used in the generating of the contribution score, for example, in the event that more than one response to the dialogue input is provided (e.g. by different participants). In such a scenario, each response may be analyzed according to the method described with reference to FIG. 2 to generate a plurality of input reaction measures, and the contribution score may be generated 16 based on the plurality of input reaction measures.

In some embodiments, each participant in a dialogue may be associated with a respective contribution score, and the input reaction measure may be determined based on the contribution score of the participant providing the response. Thus, a response from a participant having a high contribution score may influence the contribution score of the first participant to a greater extent than a participant having a lower contribution score.

In at least one embodiment, the input response measure associated with a response to a dialogue input v be weighted based on a distance (e.g. time or number of other responses) between the dialogue input and the response. For example, more distant responses may be weighted less than more proximate responses, which may advantageously provide an indication of an immediate reaction to a dialogue input. In other embodiments, more distant responses may be weighted more than more proximate responses, to identify whether a dialogue input of the first participant has a lasting effect in the dialogue, and may thereby contribute more to the dialogue.

Figure 3:
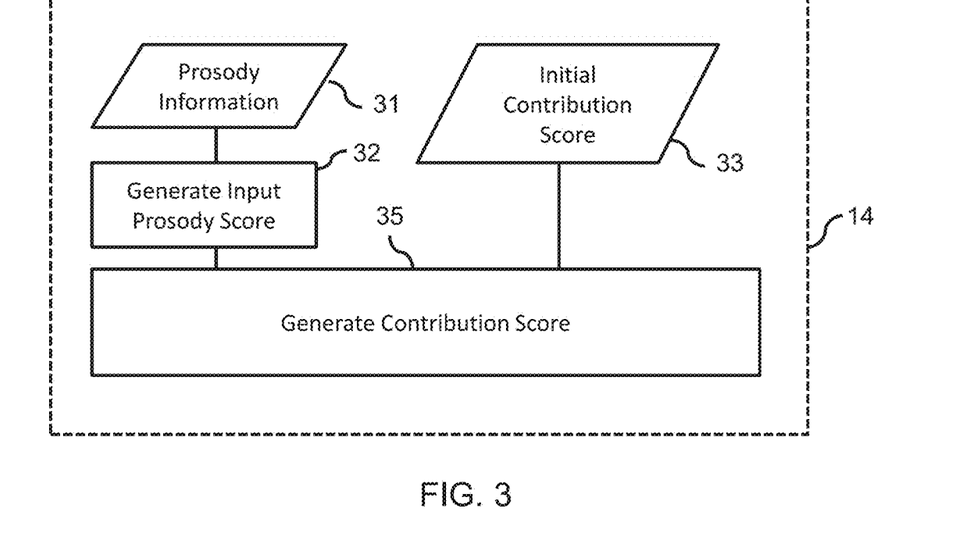
FIG. 3 is a flow chart of a step of the method of FIG. 1, in accordance with embodiments of the present invention.

FIG. 3 depicts a flow chart of a step of the method of FIG. 1, in accordance with embodiments of the present invention. In particular, FIG. 3 depicts the step of generating 14 the contribution score, in response to no response being provided, according to an exemplary embodiment. The generating 14 may comprise generating 35 the contribution score based on prosody information 31 and an initial contribution score 33.

The prosody information 31 may be information obtained by using a prosody analysis technique on the first participant's input, as previously described.

The method 14 comprises generating 32 an input prosody score based on the prosody information 31. The input prosody score may be a numerical score providing a measure of the predicted contribution of the dialogue input. In some examples, a positive numerical score may be indicative of a useful contribution, and a negative numerical score may be indicative of a non-useful contribution.

By way of example only, the input prosody score may be generated based on a number or length of hesitations of the dialogue input, an aggression of the dialogue input, a length of the dialogue input and so on. In other words, prosody information of the dialogue input may be used to generate an input prosody score associated with the dialogue input.

The initial contribution score 33 may be a score or numerical measure associated with a participant prior to generating the contribution score for the participant. By way of example, the initial contribution score 33 may be a contribution score associated with the first participant prior to the dialogue input 11.

In some embodiments, the initial contribution score may comprise a contribution score previously obtained in response to a previous dialogue input of the participant. In such embodiments, the contribution score may track or measure a contribution of the participant over the course of a dialogue. In other words, the contribution score may be iteratively adjusted or updated for successive inputs of the first participant to the dialogue, thereby representing a cumulative or composite contribution score.

In other embodiments, the initial contribution score may comprise a default score (e.g., if the first participant has not yet contributed to the dialogue). In yet other embodiments, the initial contribution score may comprise a historic contribution score, such as a contribution score of the first participant obtained from a previous dialogue. By way of example, if the first participant has historically been disruptive or known to generally not provide relevant contributions to a dialogue, the initial contribution score of the first participant may be lower than if the participants are known to generally provide highly relevant contributions.

Put yet another way, the generating 32 the contribution score may comprise updating or adjusting an initial contribution score of the first participant (e.g. from earlier in the dialogue, or from historical dialogues). Here, the generating the contribution score may be based on at least prosody information associated with a dialogue input of the first participant.

In yet other embodiments, the initial contribution score of the first participant may be determined based on one or more attributes of the participant. By way of example, the one or more attributes may comprise any of the following: a role of the first participant, a knowledge level of the first participant, a seniority of the first participant, an experience level of the first participant, a security level of the first participant, responsibilities of the first participant; and an age of the first participant.

The generating 35 the contribution score may comprise simply summing the initial contribution score 33 and the input prosody score 32. In other embodiments, the initial contribution score and the input prosody score may be algorithmically processed (e.g. using a weighting system) to generate the contribution score.

Methods according to some embodiments may comprise tracking an amount of time since the first participant last provided a dialogue input and generating the input prosody score further based on the time since the first participant last provided a dialogue input.

By way of example, if a participant provides a new dialogue input and if a period of time since a participant last provided a dialogue input s small (e.g. less than a predetermined period of time such as 1 minute, 2 minutes or 5 minutes), the associated input prosody score may be weighted more strongly as they are actively participating. If a period of time since a participant last provided a dialogue input is long (e.g. greater than a predetermined period of time), the associated input prosody score may be weighted less strongly as they are not actively participating. Thus, in exemplary embodiments, the longer a time between dialogue inputs of a participant, the smaller the participant's contributions are weighted.

Figure 4:
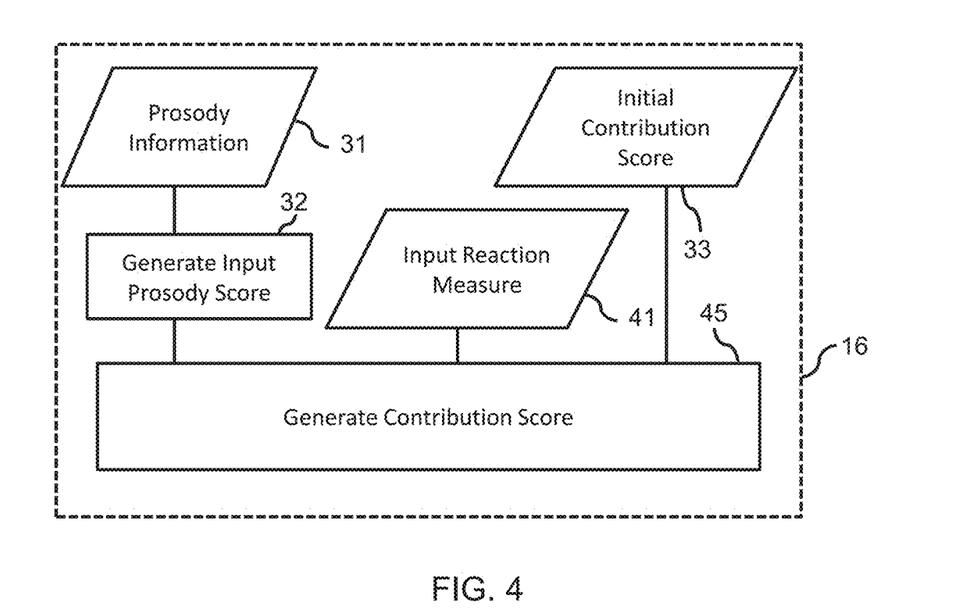
FIG. 4 is a flow chart of a step of the method of FIG. 1, in accordance with embodiments of the present invention.

FIG. 4 depicts a flow chart of a step of the method of FIG. 1, in accordance with embodiments of the present invention. In particular, FIG. 4 shows the step of generating 16 the contribution score in response to a response to the dialogue input being provided, according to an exemplary embodiment. The generating 16 may comprise generating 45 the contribution score based on prosody information 31, an initial contribution score 33, and an input reaction measure 41.

As previously described, the prosody information 31 may comprise information obtained by using a prosody analysis technique on the first participant's input. The method may comprise generating 32 an input prosody score based on the prosody analysis technique, as described with reference to FIG. 3.

The initial contribution score 33 may be a contribution score of the first participant prior to the dialogue input 11, or as previously described.

The input reaction measure 41 may be generated as previously described with reference to FIG. 2. Furthermore, the input reaction measure may be a numerical measure of the reaction associated with the response of another participant to the dialogue input of the first participant.

More than one input reaction measure 41 may be used in the generating of the contribution score, for example, in the event that more than one response to the dialogue input is provided (e.g. by different participants).

Thus, the generating 45 the contribution score may comprise updating or adjusting an initial contribution score 33 of the first participant (e.g. from earlier in the dialogue, or from historical dialogues) based on one or more input reaction measures 41 associated with differ participants.

The generating the contribution score may comprise updating or adjusting the initial contribution score 33 further based on prosody information 31 of the first participant. In embodiments, a contribution score for the first participant may be calculated without the prosody information of the first participant being used, for example, if one or more responses to the contribution are provided, which may recognize that a response of another participant may more effectively represent the contribution of the first participant.

Figure 5:
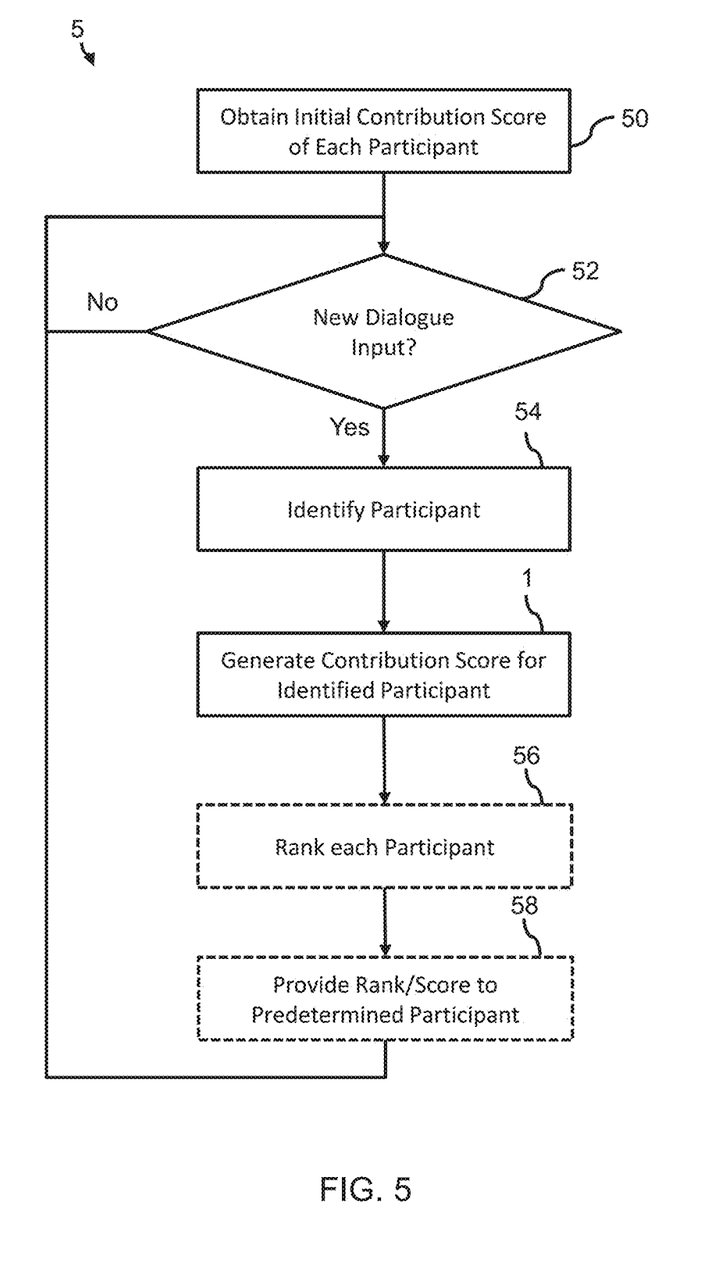
FIG. 5 is a flowchart of a method of generating contribution scores for a plurality of participants in a dialogue, in accordance with embodiments of the present invention.

With continued reference to the drawings, FIG. 5 is a flowchart of a method 5 of generating contribution scores for a plurality of participants in a dialogue, in accordance with embodiments of the present invention.

The method 5 may comprise obtaining 50 an initial contribution score for each participant in the dialogue. In other words, each participant in the dialogue may be associated with a contribution score, which may be updated and adjusted according to an embodiment hereafter described.

As previously discussed, the initial contribution score may be: a contribution score previously obtained in response to a previous dialogue input of the participant; a default contribution score; or a historic contribution score.

In some conceivable embodiments, the initial contribution score of a participant (e.g. a first participant) may be determined based on one or more attributes of a participant. By way of example, the one or more attributes may comprise any of the following: a role of the participant, a knowledge level of the participant, a seniority of the participant, an experience level of the participant, a security level of the participant, responsibilities of the participant; and an age of the participant.

In yet other embodiments, the initial contribution score of a participant may be set by a predetermined participant in the dialogue (e.g. a chairperson). For example, a predetermined participant in the dialogue may set or define an initial contribution score of the first participant. Thus, a chairperson may define the initial conditions under which contribution scores are subsequently calculated.

The initial contribution score of a participant in a dialogue may thereby be weighted based on a variety of factors, such as historic contribution scores, or a relative importance of the participant (e.g. the instigator or arbitrator of the dialogue may be assigned a greater initial contribution score).

The method 5 may comprise determining 52 whether there is a new dialogue input in the dialogue.

If a new dialogue input is detected, the method may comprise identifying 54 the participant providing the dialogue input from the plurality of participants in the dialogue. That is, the method may comprise determining an identity of a first participant who provides the dialogue input.

The participant may be identified using a number of participant identification techniques, for example, IBM® Speaker Recognition, Nuance® or Siri®.

The method 5 may further comprise generating 1 a contribution score for the identified participant according to an exemplary embodiment. Thus, the method may include determining the identified participant to be the first participant, and generating 1 a contribution score for the first participant as previously described with reference to at least FIG. 1, for example.

The method 5 may continue to monitor for new dialogue inputs. In this way, the contribution score of each participant in the dialogue may be iteratively adjusted based on the participant's dialogue inputs (i.e. the participant's contributions) and other participant's responses to their dialogue inputs.

The method 5 may further comprise ranking 56 each participant in the dialogue based on the participant's contribution score, for example, in a hierarchy or scale. Thus, participants having higher contribution scores may be ranked higher than participants having lower contribution scores, which provides a simple method of enabling quick and reliable identification of relative influence or contribution of a participant in a dialogue. Thus, there may be provided a method of ranking participants in a dialogue, based on the participant's contribution to the dialogue as represented by the participant's contribution score.

The method 5 may comprise providing 58 the contribution score and/or rank to a predetermined or designated participant in the dialogue (e.g. a chairperson or minute-taker). In at least one embodiment, the input reaction measure may be generated based on the rank of the participant who provided the associated response.

Figure 6:
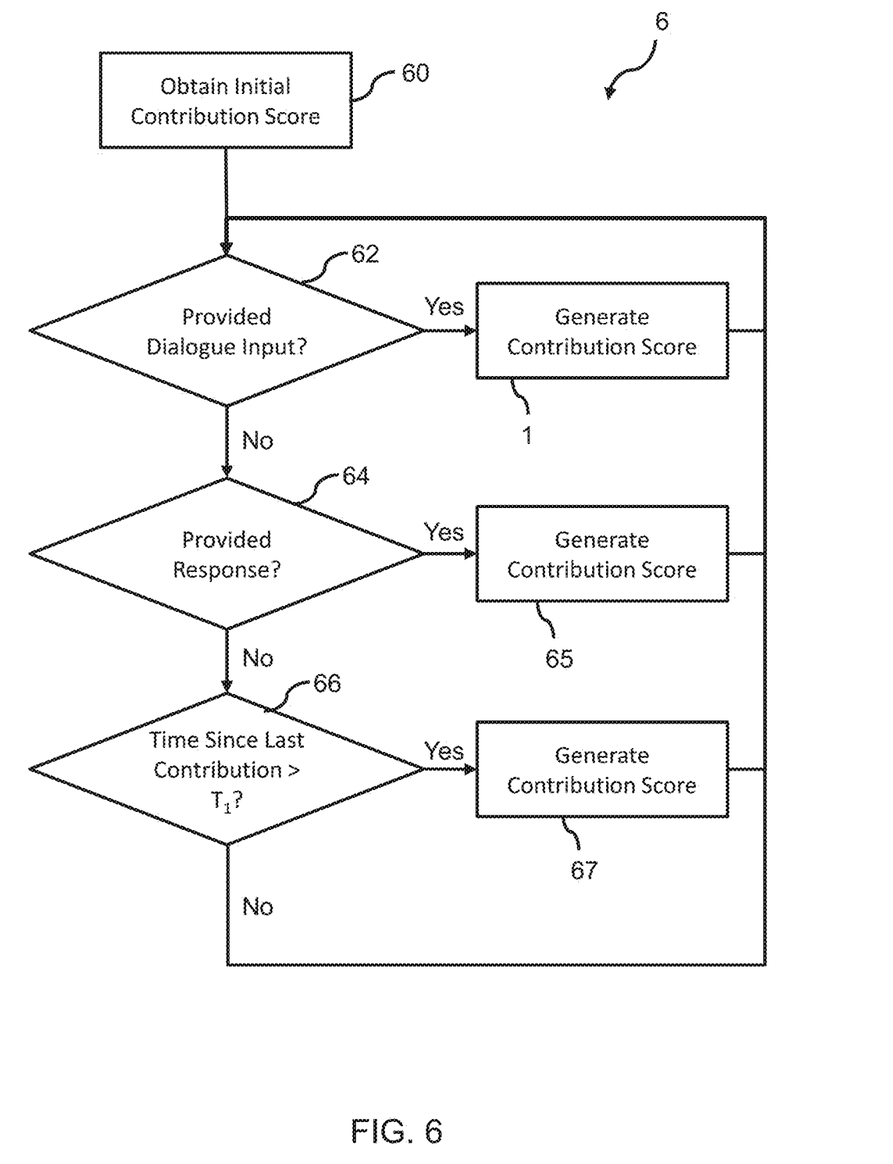
FIG. 6 is a flow chart of a method of iteratively updating a particular participant's contribution score based on the particular participant's dialogue inputs and responses, in accordance with embodiments of the present invention.

Generating the contribution score may be an iterative procedure, with the contribution score of a relevant participant being updated or adjusted with each new dialogue input of that participant, FIG. 6, is a flow chart of a method 6 of iteratively updating a particular participant's contribution score based on the particular participant's dialogue inputs and responses, in accordance with embodiments of the present invention.

Thus, a contribution score for each participant may be calculated or determined each time a participant contributes to a conversation, be this in response to a dialogue input of another participant or as a separate, new dialogue input.

The method 6 may comprise obtaining 60 an initial contribution score of the participant, using, for example, methods previously described.

The method may further comprise determining 62 whether the participant has provided a dialogue input. In response to determining that a dialogue input has been provided, the method 6 may comprise 1 generating a contribution score (e.g. updating the initial contribution score) as previously described, for example, with reference to at least FIG. 1.

In response to determining 62 that no dialogue input has been provided, the method may comprise determining whether the participant has provided a response (e.g. to another participant's dialogue input).

The distinction between whether the participant provides a dialogue input or a response may be determined based on a number of factors, for example, a time since the most recent contribution by another participant, key word/phrase recognition, prosody analysis techniques, etc.

In response to determining 64 that the particular participant has provided a response, the method 6 may comprise generating 65 a contribution score (e.g. updating the initial contribution score) based on the response. In exemplary embodiments, tone analysis of the response may be used to adjust a contribution score of the participant providing a response. By way of example, a participant providing a response with a belligerent or bored tone may be considered to not be contributing to the dialogue, and the participant's contribution score may be decreased accordingly. The generating the contribution score based on the response may be carried out in substantially the same way as generating a contributions score based on a dialogue input, as described with reference to FIG. 1, with the response acting as the dialogue input.

Methods according to various embodiments may adjust or generate a contribution score of a participant based on the participant's response to another participant's dialogue input. In some examples, a participant that responds more often may be considered to be contributing more to the conversation, and may have the participant's contribution score increased accordingly.

The method 6 may further comprise, in response to determining that no response has been provided, determining 66 whether a time since a last contribution of the particular participant is greater than a predetermined period of time $T_1$.

The determining 66 may comprise determining whether a period of time since any contribution (i.e. response or dialogue input) is greater than the predetermined period of time. In one alternative embodiment, determining 66 comprises determining whether a period of time since the particular participant provided a dialogue input (i.e. excluding responses) is greater than the predetermined period of time.

In response to determining 66 that a time since a contribution of the particular participant is greater than a predetermined period of time, the method may comprise generating a contribution score (e.g. updating the initial contribution score).

In at least one embodiment, a contribution score of a participant may be reduced over a period of time, for example, if the participant does not provide a contribution. Thus, if a participant does not provide an input into the dialogue for a predetermined period of time, the participant's contribution score may be decreased, indicating that the participant is not contributing to the dialogue.

As briefly described, methods according to embodiments may comprise distinguishing between a new dialogue input and a response to a previous dialogue input. In other words, the method may determine whether a participant (i.e. other than the first participant) is responding to a previous dialogue input, or providing a new dialogue input.

The distinguishing may be performed using a prosody analysis technique, for example, identifying a tone or pitch potentially indicative of a response (e.g. a questioning or disparaging tone) or identifying a hesitation of the participant. In other examples, identification of key words may be used to distinguish between a new dialogue input and a response (e.g. whether a dialogue input contains words or phrases used in the previous dialogue input).

Thus, methods according to embodiments may comprise identifying responses to a dialogue input based on, for example, key word/phrase recognition, prosody analysis techniques or tone analysis techniques.

In other or further embodiments, there may be some degree of overlap between a response provided by a participant and a dialogue input of that participant. For example, if a participant provides a contribution indicating that "Material B is better than your suggestion of Material A", the participant has both provided a new dialogue input (suggestion of Material A) and provided a response to n earlier participant (Material B is not ideal). In such a scenario, the contribution of the participant may be considered as both as both a response to the dialogue input of the earlier participant and as a new dialogue input (for which the dialog input may be assessed whether further responses are provided).

Some embodiments may comprise individually tracking all dialogue contributions of each participant. In such embodiments, no distinction need be made between a response and a new dialogue input (i.e. the response and the new dialogue input may be considered as one and the same).

In at least one embodiment, the contribution score may be calculated each time a participant speaks or otherwise contributes and this contribution score can be merged with the previously calculated scores during the same dialogue or meeting for that participant.

One further embodiment may comprise using calculated contribution scores across different dialogues or meetings, which may, for example, recognize that someone known to be disruptive may start the dialogue or meeting on a low score.

In at least one embodiment, a method may further comprise determining a current topic of the dialogue, being the subject-matter currently under discussion. The method may comprise determining different contribution scores (e.g. for each or particular participants) for different topics. That is, a participant may be associated with a plurality of contribution scores, each contribution score being associated with a different topic.

In other or further embodiments, the method may comprise reducing a participant's contribution score if the subject of a dialogue input does not relate to a desired or target topic(s) of discussion. In some examples, the desired or target topic(s) of discussion may be determined by a designated participant in the dialogue, or the desired or target topic(s) may be the topic of the previous dialogue input.

Thus, in at least one embodiment, the generating of a participant's contribution score may be further based on a topic of the subject-matter of the participant's dialogue input and/or responses. By way of example, certain topics (i.e. preferred topics) may be more heavily weighted than other topics (i.e. less preferable topics). Thus, if a participant's contribution relates to a preferred topic, the adjusted or generated contribution score may be greater (e.g. a higher value) than if a participant's contribution relates to a less-preferred topic.

Identification of the current topic may be performed, for example, by one or more designated participants indicating (e.g. via a vote) whether a topic is relevant or irrelevant. Alternatively, the method may comprise identifying a current topic by identifying key words in a dialogue input, for example, using voice recognition software and/or consulting a list of relevant key words/phrases.

Described embodiments may be particularly useful in numerous scenarios in which a contribution of a participant would benefit from being scored or otherwise indicated.

By way of example, the method may be used during a teleconference to provide a live ranking of meeting participants, such that designated meeting participants (e.g. a chairperson) may readily ascertain other people's level of contribution to the meeting, which may allow a chairperson to ask participants, that the chairperson may have otherwise forgotten, for a contribution. The chairperson may determine which participants to ask based on the ranking or contribution score of a given participant, so that the chairperson may choose a high-ranking person (i.e. having a relatively high contribution score) to provide an opinion, for example, if the participant has been quiet for a period of time. Alternatively, the chairperson could ask a low ranking person having a relatively low contribution score) deliberately in order to encourage contributions from that participant.

In another scenario, the method may be used to record the contribution of each participant in a meeting and allow the chair to make an informed decision following the meeting in order to determine who should be invited to any follow-up meetings. In some examples, this decision could be based around specific topics, that is, there may be a set of independent follow-up meetings, each on a specific topic, and the appropriately knowledgeable people can be invited, according to their contributions.

In at least one other possible scenario, an interviewee may be ranked based on the contribution in an interview, such as a group interview scenario. The interviewer/assessor may use the information to provide evidence to help support or make the interviewer/assessor's assessment of the candidate's abilities/appropriateness, which may help in the determination of who should be hired or who should proceed to the next phase of interviews. In particular, the embodiment may include determining the behavior of each candidate (i.e. their contribution to an interview).

Purely for the sake of further explanation, a scenario is hereafter described in which a known tone analyzer or linguistic analysis service is used, namely the IBM Watson® Tone Analyzer Service. The linguistic analysis engine/service to detect communication tones in written text may be adapted to analyze both a dialogue input and one or more responses to the dialogue input. In particular, the linguistic analysis service may use prosody analysis techniques (e.g. identifying hesitations and aggression) in order to obtain prosody information of the dialogue input and/or the one or more responses.

The linguistic analysis service may identify a probability of particular emotions coming across in the dialogue input and/or responses to the dialogue input. In particular, the linguistic analysis service may be adapted to identify a probability of the emotions of anger, fear, joy, sadness, and disgust being present in a contribution, based on a prosody analysis of the contribution.

In the scenario, a first participant may be initially assigned a default contribution score, for example 1200. In other words, an initial contribution score of the first participant may be set at a default or predetermined score, here 1200.

In response to a dialogue input of the first participant, the dialogue input may be analyzed using the linguistic analysis service, which may identify a probability of various emotions (e.g. anger, fear, etc.) being present in the dialogue input. Thus, prosody information of the dialogue input may be obtained.

Assuming that no response is provided to the dialogue input, a contribution score of the participant may be generated based on the initial contribution score and the prosody information. In particular, an input prosody score may be generated based on the prosody information, and a contribution score may be determined based on the initial contribution score and the input prosody score.

A simple calculation may be performed on the prosody information to generate an input prosody score. The calculation may comprise subtracting the probability of negative emotions, such as sadness, being present in the dialogue input from the probability of positive emotions, such as joy, being present n the dialogue input, and multiplying by a constant score or value (e.g. 400). The constant score or value of 400 may be selected as a constant so that a participant may never lose or gain more than 400 in any single step. The value of the constant score or value may depend, for example, on the combined initial contribution scores of participants in the dialogue, an assigned score by a designated participant or according to a particular scheme.

For example, if a probability of the dialogue input carrying an emotion of joy is 0.6 and a probability of the dialogue input carrying an emotion of sadness is 0.2, the calculation may result in an input prosody score of 160 (400*(0.6−0.2)).

The contribution score may be calculated by summing the initialcontribution score (e.g. 1200) and the input prosody score (e.g. 160). Thus, in this example, the contribution score may be determined to be 1360.

However, if a response is provided to the dialogue input, a contribution score may be generated based on the initial contribution score, an input reaction measure associated with the response and the prosody information.

For example, the method may comprise, if a response to a first participant's dialogue input is determined to be positive, performing the following equation to determine an input reaction measure (r):

$$r = 400\left(\frac{p}{s}\right) \quad (1)$$

where p is the contribution score of the person providing the positive response, and s is the combined contribution score of all participants in the dialogue. The constant value of 400 may be different (e.g. 200, 300, 1000) in different embodiments, and is only provided here for the sake of explanation.

If a response to a first participant's dialogue input is determined to be negative, the method may comprise performing the following equation to determine the input reaction measure (r):

$$r = 400\left(\frac{N}{s}\right) \quad (2)$$

where N is the contribution score of the person providing the negative response, and s is the combined contribution score of all participants in the dialogue.

A negative input reaction measure may be subtracted from the first participant's initial contribution score, whereas a positive input reaction measure may be added to the first participant's initial contribution score.

Use of the combined contribution score in the algorithms may enable a relative weighting of a respondent's own contribution score to be taken into account, which may also ensure that a change in participant's contribution score may not change by more flan a constant value (e.g. 400).

In exemplary embodiments, the contribution score of the first participant may be generated by summing the initial contribution score, the input prosody score and all positive input reaction measures, and subtracting all negative input reaction measures.

The input reaction measure may thereby depend upon a current contribution score of the associated participants (i.e. participants who provide a response to the dialogue input).

For example, there may be a dialogue between three people: A with an initial contribution score of 500, B with an initial contribution score of 500 and C with an initial contribution score of 2000. Consider the following scenario, in which contribution scores are calculated solely on input reaction measures and initial contributions scores, where A contributes (i.e. provides a dialogue input) to the dialogue and B responds negatively followed by a positive response from C:

First the negative response from B may be taken into account (i.e. as B responded first). Because the response is negative, the algorithm used may deduct points from A's score, as follows:

$$\text{Points Deducted} = 400\left(\frac{500}{3000}\right) \quad (3)$$

Giving A a new contribution score of 433.3, which is a loss of 66.7 points.

C's response may then be taken into account, and because C's response was positive, the algorithm used may add points to A's score, as follows:

$$\text{Points Added} = 400\left(\frac{2000}{3000}\right) \quad (4)$$

Giving A a final score of 699.9, thus a net increase of 199 points. Despite B's negative response, because C has a higher score; therefore, C's response is deemed more influential/highly ranked, and has a greater effect on another person's score.

In some embodiments, the combined contribution score in the dialogue is calculated after each addition and/or deduction of the scores, thus the value of 3000 in equation 4 may instead be 1933.3 (433.3+500+1000).

As will be understood, the calculated contribution score may be used as an initial contribution score for further dialogue inputs associated with the first participant (e.g. A).

In some embodiments, there may be provided a computer program adapted to carry out a method as previous described, with reference to FIGS. 1-6.

In some embodiments, there may be provided a system comprising a processing arrangement adapted to carry out any method previously described with reference to FIGS. 1-6.

Figure 7:
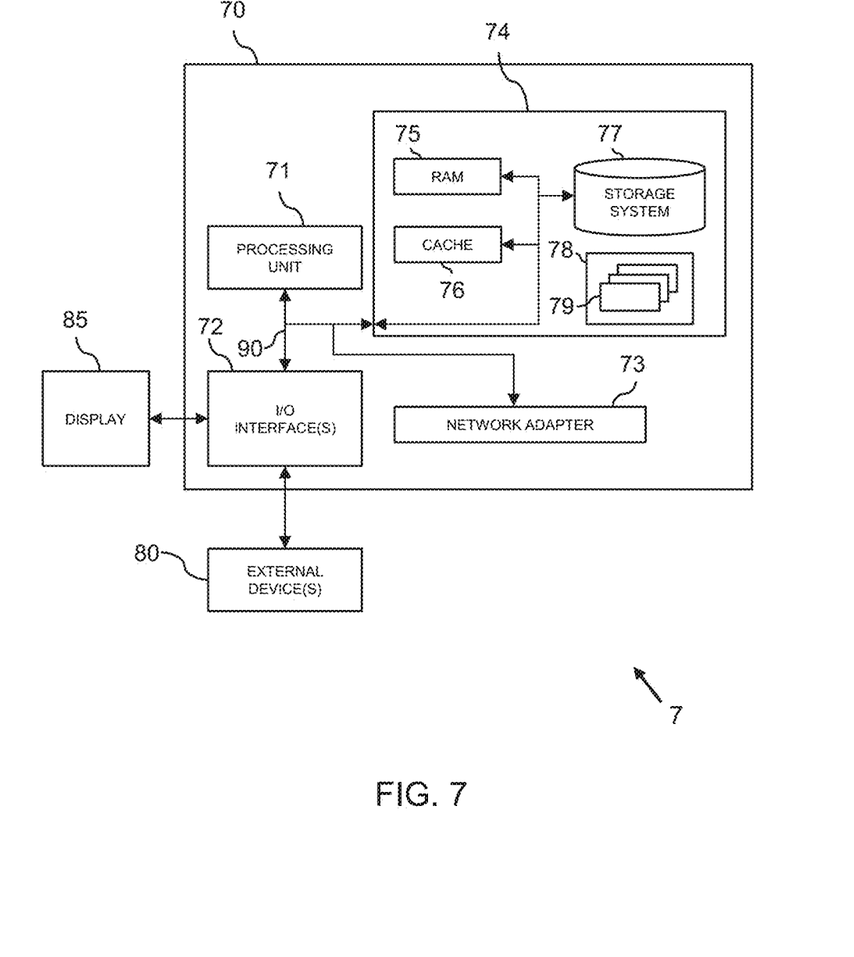
FIG. 7 is a block diagram of a computer system capable of implementing the methods of FIGS. 1-6, in accordance with embodiments of the present invention.

FIG. 7 is a block diagram of a computing system capable of implementing the methods of FIGS. 1-6, in accordance with embodiments of the present invention. By way of example, as illustrated in FIG. 7, embodiments may comprise a computer system 70, which may form part of a networked system 7. The components of computer system/senier 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction cution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus s), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or t ore exec table instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

It will be understood that not all embodiments of the invention may have all above described potential advantages, and described advantages are not necessarily required of all embodiments. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for real-time ranking of a contribution of participants during a live teleconference, the method comprising:
    setting, by a processor of a computing system, an initial contribution score of a first participant to the live teleconference, the initial contribution score being set by a predetermined participant to the live conference, and weighted based on a relative importance of the first participant to the live conference as perceived by the predetermined participant;

determining, by the processor, a current topic of the live conference;

generating, by the processor, an adjusted contribution score of the first participant based on the current topic of the live teleconference, wherein the adjusted contribution score is adjusted based on whether the current topic is a preferred topic of the first participant;

analyzing, by the processor, a dialogue input of the first participant using a prosody analysis technique to obtain prosody information associated with the dialogue input relating to the current topic;

determining, by the processor, that at least one of the one or more other participants provides a response, in the dialogue, to the dialogue input of the first participant, by distinguishing between a new dialogue input and a response to the dialogue input using the prosody analysis technique;

in response to determining that the response is provided:
analyzing, by the processor, the response using the prosody analysis technique to identify an emotive reaction associated with the response;

determining, by the processor, an input reaction measure indicative of the emotive reaction by the at least one of the one or more other participants to the dialogue input of the first participant;

weighting, by the processor, the input reaction measure based on a time between the dialogue input of the first participant and the response, wherein a distant response is weighted greater than a proximate response to identify whether the dialogue input had a lasting effect on the one or more participants;

generating, by the processor, a new contribution score based on the weighted input reaction measure and the current topic of the live conference, the new contribution score indicative of a first participant's contribution to a dialogue between the first participant and one or more other participants, wherein the new contribution score generated during the live conference for the first participant is measured from the adjusted contribution score;

in response to determining that no response is provided:
generating, by the processor, the new contribution score based on at least the prosody information associated with the dialogue input, measured from the adjusted contribution score; and ranking, by the processor, the first participant with respect to the one or more other participants based on the new contribution score during the live teleconference.

2. The method of claim 1, wherein the generating the new contribution score in response to determining that a response is provided is further based on the prosody information of the dialogue input.

3. The method of claim 1, wherein the prosody analysis technique is selected from the group consisting of: a tone analysis technique, a pitch analysis technique, a rhythm analysis technique, and a spectral analysis technique.

4. The method of claim 3, wherein the determining the input reaction measure comprises analyzing, by the processor, the response using a tone analysis algorithm to determine the input reaction measure.

5. The method of claim 1, wherein the determining the input reaction measure comprises:
analyzing, by the processor, the response to determine whether the response is positive or negative; and determining, by the processor, the input reaction measure based on the determination of whether the response is positive or negative.

6. The method of claim 1, wherein:
the analyzing the dialogue input of the first participant using the prosody analysis technique comprises analyzing, by the processor, the dialogue input of the first participant so as to determine an emotion score indicative of an emotion of the first participant during provision of the dialogue input; and the generating the new contribution score in response to no response being provided comprises generating, by the processor, the new contribution score based on the emotion score;

the response from the first participant having a high contribution score influences the new contribution score of the first participant to a greater extent than a participant having a lower contribution score.

7. The method of claim 1, wherein the relative importance of the first participant is based on at least one attribute of the first participant.

8. The method of claim 7, wherein the at least one attribute is selected from the group consisting of: a role of the first participant, a knowledge level of the first participant, a seniority of the first participant, an experience level of the first participant, a security level of the first participant, responsibilities of the first participant, and an age of the first participant.

9. The method of claim 1, further comprising identifying, by the processor, the identity of the first participant in the dialogue.

10. A method of ranking participants in a dialogue between a first participant and one or more other participants, the method comprising:
generating the new contribution score of the first participant according to claim 1;

obtaining a respective contribution score for each of the one or more other participants; and ranking each participant in the dialogue based on their respective contribution scores.

11. The method of claim 10, further comprising providing the contributions score for each participant to a predetermined participant in the dialogue.

12. A computer program product, comprising a computer readable hardware storage device storing a computer readable program code, the computer readable program code comprising an algorithm that when executed by a computer processor of a computing system implements a method for real-time ranking of a contribution of participants during a live teleconference, the method comprising:
setting, by a processor of a computing system, an initial contribution score of a first participant to the live teleconference, the initial contribution score being set by a predetermined participant to the live conference, and weighted based on a relative importance of the first participant to the live conference as perceived by the predetermined participant;

determining, by the processor, a current topic of the live conference;

generating, by the processor, an adjusted contribution score of the first participant based on the current topic of the live teleconference, wherein the adjusted contribution score is adjusted based on whether the current topic is a preferred topic of the first participant;

analyzing, by the processor, a dialogue input of the first participant using a prosody analysis technique to obtain prosody information associated with the dialogue input relating to the current topic;

determining, by the processor, that at least one of the one or more other participants provides a response, in the dialogue, to the dialogue input of the first participant, by distinguishing between a new dialogue input and a response to the dialogue input using the prosody analysis technique;

in response to determining that the response is provided:
  analyzing, by the processor, the response using the prosody analysis technique to identify an emotive reaction associated with the response;
  determining, by the processor, an input reaction measure indicative of the emotive reaction by the at least one of the one or more other participants to the dialogue input of the first participant;
  weighting, by the processor, the input reaction measure based on a time between the dialogue input of the first participant and the response, wherein a distant response is weighted greater than a proximate response to identify whether the dialogue input had a lasting effect on the one or more participants;
  generating, by the processor, a new contribution score based on the weighted input reaction measure and the current topic of the live conference, the new contribution score indicative of a first participant's contribution to a dialogue between the first participant and one or more other participants, wherein the new contribution score generated during the live conference for the first participant is measured from the adjusted contribution score;

in response to determining that no response is provided:
  generating, by the processor, the new contribution score based on at least the prosody information associated with the dialogue input, measured from the adjusted contribution score; and ranking, by the processor, the first participant with respect to the one or more other participants based on the new contribution score during the live teleconference.

13. A computer system comprising:
a processor;
a memory device coupled to the processor; and
a computer readable storage device coupled to the processor, wherein the storage device contains program code executable by the processor via the memory device to implement a method for real-time ranking of a contribution of participants during a live teleconference, the method comprising:

setting, by a processor of a computing system, an initial contribution score of a first participant to the live teleconference, the initial contribution score being set by a predetermined participant to the live conference, and weighted based on a relative importance of the first participant to the live conference as perceived by the predetermined participant;

determining, by the processor, a current topic of the live conference;

generating, by the processor, an adjusted contribution score of the first participant based on the current topic of the live teleconference, wherein the adjusted contribution score is adjusted based on whether the current topic is a preferred topic of the first participant;

analyzing, by the processor, a dialogue input of the first participant using a prosody analysis technique to obtain prosody information associated with the dialogue input relating to the current topic;

determining, by the processor, that at least one of the one or more other participants provides a response, in the dialogue, to the dialogue input of the first participant, by distinguishing between a new dialogue input and a response to the dialogue input using the prosody analysis technique;

in response to determining that the response is provided:
  analyzing, by the processor, the response using the prosody analysis technique to identify an emotive reaction associated with the response;
  determining, by the processor, an input reaction measure indicative of the emotive reaction by the at least one of the one or more other participants to the dialogue input of the first participant;
  weighting, by the processor, the input reaction measure based on a time between the dialogue input of the first participant and the response, wherein a distant response is weighted greater than a proximate response to identify whether the dialogue input had a lasting effect on the one or more participants;
  generating, by the processor, a new contribution score based on the weighted input reaction measure and the current topic of the live conference, the new contribution score indicative of a first participant's contribution to a dialogue between the first participant and one or more other participants, wherein the new contribution score generated during the live conference for the first participant is measured from the adjusted contribution score;

in response to determining that no response is provided:
  generating, by the processor, the new contribution score based on at least the prosody information associated with the dialogue input, measured from the adjusted contribution score; and
  ranking, by the processor, the first participant with respect to the one or more other participants based on the new contribution score during the live teleconference.

14. The computer system of claim 13, wherein the generating the new contribution score in response to determining that a response is provided is further based on the prosody information of the dialogue input.

15. The computer system of claim 13, further comprising analyzing, by the processor, the response using a tone analysis algorithm to determine the input reaction measure.

16. The computer system of claim 13, wherein the input reaction measure is determined by:
analyzing, by the processor, the response to determine whether the response is positive or negative; and
determining, by the processor, the input reaction measure based on the determination of whether the response is positive or negative.

17. A system for ranking participants in a dialogue between a first participant and one or more other participants, the system comprising the computer system according to claim 13, wherein the processor is further adapted to:
obtain a respective contribution score for each of the one or more other participants; and
rank each participant in the dialogue based on their respective contribution scores.

* * * * *